United States Patent
Pajukoski et al.

(10) Patent No.: US 9,531,515 B2
(45) Date of Patent: Dec. 27, 2016

(54) LOCAL AREA OPTIMIZED UPLINK CONTROL CHANNEL

(75) Inventors: Kari Pekka Pajukoski, Oulu (FI); Esa Tapani Tiirola, Kempele (FI)

(73) Assignee: Nokia Solutions and Networks Oy, Espoo (FI)

(*) Notice: Subject to any disclaimer, the term of this patent is extended or adjusted under 35 U.S.C. 154(b) by 1080 days.

(21) Appl. No.: 12/997,307

(22) PCT Filed: Jun. 10, 2009

(86) PCT No.: PCT/EP2009/057176
§ 371 (c)(1),
(2), (4) Date: Dec. 10, 2010

(87) PCT Pub. No.: WO2009/150177
PCT Pub. Date: Dec. 17, 2009

(65) Prior Publication Data
US 2011/0085516 A1    Apr. 14, 2011

Related U.S. Application Data

(60) Provisional application No. 61/131,718, filed on Jun. 11, 2008.

(51) Int. Cl.
*H04W 72/04* (2009.01)
*H04L 5/00* (2006.01)
(Continued)

(52) U.S. Cl.
CPC ............ *H04L 5/0048* (2013.01); *H04L 5/001* (2013.01); *H04L 5/0053* (2013.01);
(Continued)

(58) Field of Classification Search
CPC ...... H04L 5/0048; H04L 5/0053; H04L 5/001; H04L 5/0007; H04L 25/0224; H04W 84/10
(Continued)

(56) References Cited

U.S. PATENT DOCUMENTS

| 2005/0113129 | A1 | 5/2005 | Robinson et al. |
| 2009/0034505 | A1* | 2/2009 | Papasakellariou et al. .. 370/344 |
| 2010/0135273 | A1* | 6/2010 | Kim .............................. 370/344 |

FOREIGN PATENT DOCUMENTS

| CN | 101099308 A | 1/2008 |
| CN | 101167395 A | 4/2008 |

(Continued)

OTHER PUBLICATIONS

R1-050816, 3GPP TSG-RAN WG1 Meeting #42, London, UK, Aug. 29.-Sep. 2, 2005, Nokia, "Frequency-domain scheduling with SC-FDMA in UL", 2 pgs.

(Continued)

*Primary Examiner* — Thai Nguyen
(74) *Attorney, Agent, or Firm* — Harrington & Smith

(57) ABSTRACT

A method for performing uplink signaling and data transmission between a terminal device and a network element is described. The method includes applying, during a transmission, at least one of TDM and FDM between a SRS, a control channel, a DRS and a data channel. Clustered sub carrier mapping is applied for the SRS and the control channel. The SRS is transmitted so as to function as a DRS for the control channel. The control channel and the data channel are transmitted during a same sub-frame. The method also includes receiving the SRS and receiving the control channel and the data channel during a same sub-frame. Control information and data are extracted from the control channel and the data channel. The SRS is used as a DRS for the control channel is included in the method. Apparatus and computer readable media are also described.

40 Claims, 7 Drawing Sheets

(51) Int. Cl.
*H04L 25/02* (2006.01)
*H04W 84/10* (2009.01)

(52) U.S. Cl.
CPC ........ *H04L 5/0007* (2013.01); *H04L 25/0224* (2013.01); *H04W 84/10* (2013.01)

(58) Field of Classification Search
USPC ........................................................ 370/330
See application file for complete search history.

(56) References Cited

FOREIGN PATENT DOCUMENTS

| | | |
|---|---|---|
| CN | 101099308 A | 7/2008 |
| EP | 1871035 A1 | 12/2007 |
| JP | 2008/042861 A | 2/2008 |
| RU | 2258317 C2 | 8/2005 |
| RU | 2006134653 A | 4/2008 |
| WO | WO 2004107606 A1 | 12/2004 |
| WO | WO 2006/051372 A1 | 5/2006 |
| WO | WO 2007003121 A1 | 1/2007 |
| WO | WO 2007/078146 A1 | 7/2007 |
| WO | WO 2008/006088 A2 | 1/2008 |
| WO | WO 2008/008748 A2 | 1/2008 |
| WO | WO 2008/030798 A2 | 3/2008 |

OTHER PUBLICATIONS

Ericsson: "A discussion on some technology components for LTE-Advanced"; R1-082024; TSG-RAN WG1 #53, Kansas City, MO, USA, May 5-9, 2008; 3GPP Draft; R1-082024 {LTE-Advanced Technology Components}; 3rd Generation Partnership Project (3GPP), Mobile Competence Centre; 650, Route des Lucioles; F-06921 Sophia-Antipolis Cedex; France; vol. RAN WG1, No. Kansas City, USA; 20080514, May 14, 2008 (May 14, 2008), XP050110365, [retrieved on May 14, 2008] Sections 1.1, 1.2, 2.1, 2.1.2, 2.2 (11 pages).

Nokia Siemens Networks et al: "LTE-A—Requirements"; R1-081842; RAN WG1 #53, Kansas City, MO, USA, May 5-9, 2008; 3rd Generation Partnership Project (3GPP), Mobile Competence Centre; 650, Route des Lucioles; F-06921 Sophia-Antipolis Cedex; France (10 pages).

Ericsson et al: "Text proposal for DC-HSDPA assumptions and standards impact"; R1-082249; 3GPP TSG-RAN WG1 Meeting #53, Kansas City, MO, USA, May 5-9, 2008; 3GPP Draft; R1-082249 Text Proposal for DC-HSDPA assumptions and standards impact; 3rd Generation Partnership Project (3GPP), Mobile Competence Centre; 650, Route des Lucioles; F-06921 Sophia-Antipolis Cedex; France; vol. RAN WG1, No. Kansas City, USA; 20080523, May 23, 2008 (May 23, 2008), XP050110541 [retrieved on May 23, 2008]; Section 4.2-Section 4.3 (18 pages).

3GPP TR 36.913 V1.0.0 (May 2008), 3$^{rd}$ Generation Partnership Project; Technical specification Group Radio Access Network; Requirements for Further Advancements for E-UTRA (LTE-Advanced) (Release 8), 13 pgs.

3GPP TS 36.211 V1.0.0 (Mar. 2007), 3$^{rd}$ Generation Partnership Project; Technical Specification Group Radio Access Network; Physical Channels and Modulation (Release 8), 30 pgs.

3GPP TS 36.300 V8.3.0 (Dec. 2007), 3$^{rd}$ Generation Partnership Project; Technical specification Group Radio Access Network; Evolved Universal Terrestrial Radio Access (E-UTRA) and Evolved Universal Terrestrial Radio Access Network (E-UTRAN); Overall Description; Stage 2 (Release 8), 121 pgs.

3GPP TR 36.913 V0.0.6 (May 2008), 3$^{rd}$ Generation Partnership Project; Technical Specification Group Radio Access Network; Requirements for Further Advancements for E-UTRA (LTE-Advanced) (Release X), 16 pgs.

R1-050816, 3GPP TSG-RAN WG1 Meeting #42, London, UK, Aug. 29-Sep. 2, 2005, Nokia, "Frequency-domain scheduling with SC-FDMA in UL", 2 pgs.

R1-081948, 3GPP TSG RAN WG1 Meeting #53, Kansas City, MO, USA, May 5-9, 2008, DoCoMo, 29 pgs.

R1-061862, TSG-RAN WG1 LTE AdHoc, Cannes, France, Jun. 27-30, 2006, Ericsson, "Uplink Non-data-associated Control Signaling", 3 pgs.

R2-081552; Qualcomm Europe; "Further clarification on inter-RAT ANR function"; 3GPP TSG-RAN WG2 meeting #61bis; Shenzhen, China, Mar. 31-Apr. 4, 2008.

R1-081979; 3GPP TSG RAN WG1 53; Texas Instruments; "Enhancements for LTE-Advanced"; Kansas City, MO, USA, May 5-9, 2008 (13 pages).

NTT DoCoMo et al: "Multiplexing Method for Orthogonal Reference Signals for E-UTRA Uplink"; R1-063307; 3GPP TSG RAN WG1 Meeting #47, Riga, Latvia, Nov. 6-10, 2006; 3rd Generation Partnership Project (3GPP), Mobile Competence Centre; 650, Route des Lucioles; F-06921 Sophia-Antipolis Cedex; France (7 pages).

Ericsson: "A discussion on some technology components for LTE-Advanced"; R1-082024; TSG-RAN WG1 #53, Kansas City, MO, USA, May 5-9, 2008; 3GPP Draft; R1-082024 {LTE-Advanced Technology Components}; 3rd Generation Partnership Project (3GPP), Mobile Competence Centre; 650, Route des Lucioles; F-06921 Sophia-Antipolis Cedex; France; vol. RAN WG1, No. Kansas City, USA; May 14, 2008, May 14, 2008 (May 14, 2008), XP050110365, [retrieved on May 14, 2008] Sections 1.1, 1.2, 2.1, 2.1.2, 2.2 (11 pages).

Nokia Siemens Networks et al: "LTE-A —Requirements"; R1-081842; RAN WG1 #53, Kansas City, MO, USA, May 5-9, 2008; 3rd Generation Partnership Project (3GPP), Mobile Competence Centre; 650, Route des Lucioles; F-06921 Sophia-Antipolis Cedex; France (10 pages).

Huawei et al: "Association between DL control channel and UL ACK/NAK Resource for TDD"; R1-082166; 3GPP RAN1 #53 meeting, May 9, 2008; 3rd Generation Partnership Project (3GPP), Mobile Competence Centre; 650, Route des Lucioles; F-06921 Sophia-Antipolis Cedex; France (12 pages).

NEC Corporation "NEC's proposals for LTE Advanced"; REV-080022; 3GPP RAN IMT-Advanced Workshop Apr. 7, 2008 (28 pages).

Ericsson et al: "Text proposal for DC-HSDPA assumptions and standards impact"; R1-082249; 3GPP TSG-RAN WG1 Meeting #53, Kansas City, MO, USA, May 5-9, 2008; 3GPP Draft; R1-082249 Text Proposal for DC-HSDPA assumptions and standards impact; 3rd Generation Partnership Project (3GPP), Mobile Competence Centre; 650, Route des Lucioles; F-06921 Sophia-Antipolis Cedex; France; vol. RAN WG1, No. Kansas City, USA; May 23, 2008, May 23, 2008 (May 23, 2008), XP050110541 [retrieved on May 23, 2008]; Section 4.2-Section 4.3 (18 pages).

Nokia Siemens Networks et al: "Open SRS issues"; R1-074866; 3GPP TSG RAN WG1 Meeting #51, Jeju, Korea, Nov. 5-9, 2007; 3rd Generation Partnership Project (3GPP), Mobile Competence Centre; 650, Route des Lucioles; F-06921 Sophia-Antipolis Cedex; France (7 pages).

R1-050701; NTT DoCoMo, et al.; "Channel-Dependent Scheduling Method for Single-Carrier FDMA Radio Access in Evolved UTRA Uplink"; 3GPP TSG RAN WG1 #42 on LTE; London, UK, Aug. 29-Sep. 2, 2005.

R1-083730; Nokia, Nokia Siemens Networks; "L1 control signaling with carrier aggregation in LTE-Advanced"; 3GPP TSG-RAN WG1 Meeting #54bis; Prague, Czech Republic, Sep. 29-Oct. 3, 2008, (6 pages).

\* cited by examiner

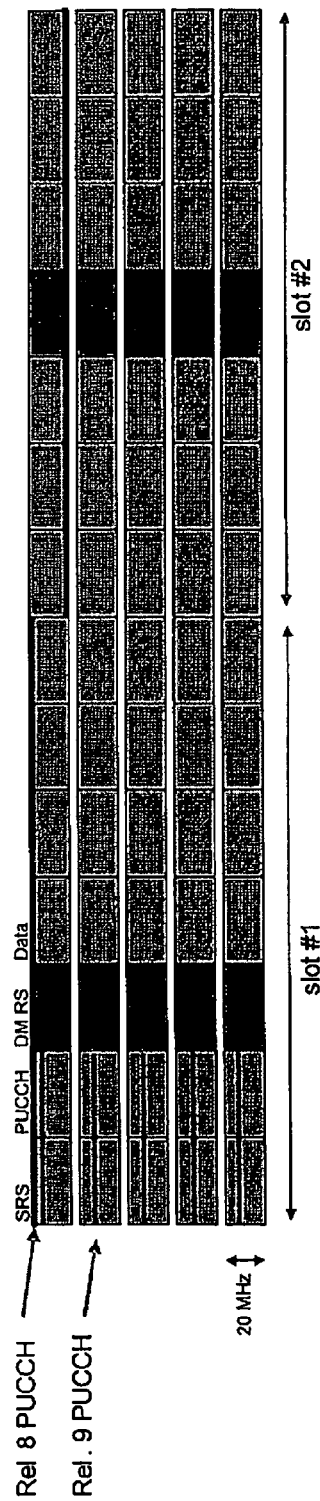
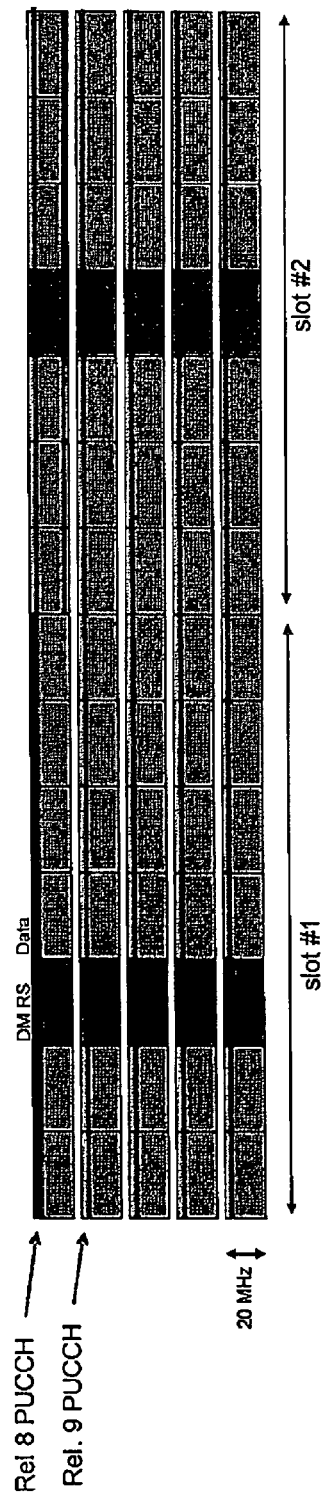
Figure 3
Figure 4

Resource allocation signalling

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|---|---|---|---|---|---|---|---|---|---|---|---|---|---|---|---|---|---|---|
| 40 | | | | 41 | | | | | | 42 | | | | 43 | | | | | 44 | | | | | 45 | | | | | 46 | | | | | 47 | | | | |
| 48 | | | | | | | | | 49 | | | | | | | | | 50 | | | | | | | | | | 51 | | | | | | | | | | |
| 52 | | | | | | | | | | | | | | | | | | 53 | | | | | | | | | | | | | | | | | | | | |
| 54 | | | | | | | | | | | | | | | | | | | | | | | | | | | | | | | | | | | | | | |

| N |
|---|
| 1 |
| 5 |
| 10 |
| 20 |
| 40 |

Figure 7

Table 1. Achievable number of bit rates, as a function of N, N_c=10, N_bl/cl=40

| 100 MHz | | # of coded bits | |
|---|---|---|---|
| N | K | QPSK 1/3 | QPSK 1/2 | 16QAM 1/2 |
| 1 | 150 | 100 | 150 | 300 |
| 5 | 750 | 500 | 750 | 1500 |
| 10 | 1500 | 1000 | 1500 | 3000 |
| 20 | 3000 | 2000 | 3000 | 6000 |
| 40 | 6000 | 4000 | 6000 | 12000 |

Figure 8

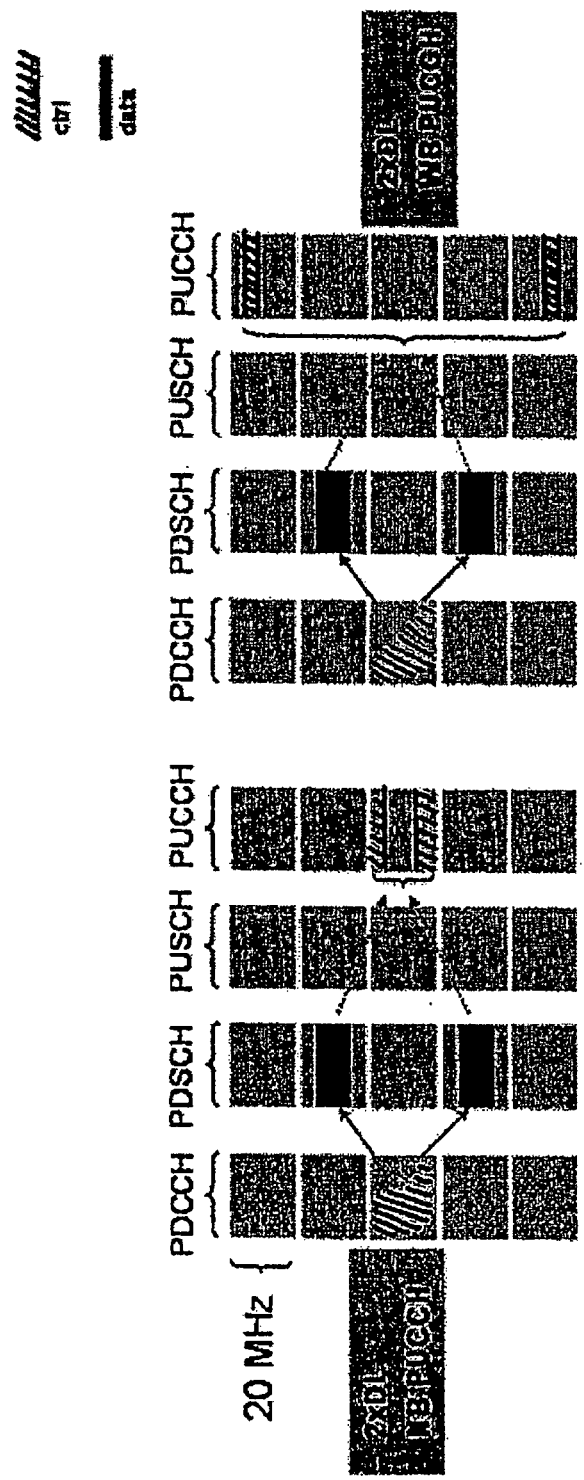

LOCAL AREA OPTIMIZED UPLINK CONTROL CHANNEL

CROSS-REFERENCE TO RELATED APPLICATIONS

This application is the National Stage of International Application No. PCT/EP2009/057176, filed Jun. 10, 2009, which claims the benefit of U.S. Provisional Application No. 61/131,718, filed Jun. 11, 2008.

TECHNICAL FIELD

The exemplary and non-limiting embodiments of this invention relate generally to wireless communication systems, methods, devices and computer program products and, more specifically, relate to techniques for performing uplink signaling and data transmission between a terminal device and a network access node.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various abbreviations that may appear in the specification and/or in the drawing figures are defined as follows:
3GPP third generation partnership project
ACK acknowledgment
BS base station
BW bandwidth
CDM code division multiplexing
CM cubic metric
CQI channel quality indicator
DFT-S discrete Fourier transform-synchronous
DL downlink
DRS demodulation reference signal (or DM RS)
DRX discontinuous receptions
DTX discontinuous transmission
eNB evolved Node B
EUTRAN evolved UTRAN
FDD frequency division duplex
FDM frequency division multiplexing
FDMA frequency division multiple access
FH frequency hopping
HARQ hybrid automatic repeat request
IFDMA interleaved frequency division multiple access
ITU international telecommunication union
ITU-R ITU radiocommunication sector
LA local area
LTE long term evolution
NACK negative ACK (or NAK)
Node B base station
OFDMA orthogonal FDMA
PAR peak to average ratio
PDCCH physical downlink control channel
PDSCH physical downlink shared channel
PUCCH physical uplink control channel
PUSCH physical uplink shared channel
QAM quadrature amplitude modulation
QPSK quadrature phase-shift keying
RACH random access channel
RB radio band
Rel. 8 3GPP Release 8
Rel. 9 3GPP Release 9
RF radio frequency
RPF repetition factor
RRC radio resource control
RS reference signal
SC single carrier
SINR signal to interference-plus-noise ratio
SNR signal-to-noise ratio
SRI scheduling request indicator
SRS sounding reference signal
TDD time division duplex
TDM time division multiplexing
TTI transmission time internal
UE user equipment
UL uplink
UMTS universal mobile telecommunications system
UpPTS uplink pilot timeslot
UTRA UMTS terrestrial radio access
UTRAN UMTS terrestrial radio access network
WA wide area A proposed communication system known as evolved UTRAN (EUTRAN, also referred to as UTRAN-LTE or as E-UTRA) is currently under development within the 3GPP. As currently specified the DL access technique is OFDMA, and the UL access technique is SC-FDMA.

One specification of interest to these and other issues related to the invention is 3GPP TS 36.300, V8.3.0 (2007, December), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

Of particular interest herein is, for example, subclause 5.2.3, "Physical uplink control channel", which states that the PUCCH is mapped to a control channel resource in the uplink. A control channel resource is defined by a code channel and two resource blocks, consecutive in time, with frequency hopping at the slot boundary. Depending on the presence or absence of uplink timing synchronization, the uplink physical control signaling can differ. In the case of time synchronization being present the control signaling consists of CQI, ACK/NAK and scheduling request indicator (SRI). The CQI informs the scheduler about the current channel conditions as seen by the UE. If multiple-input and multiple-output (MIMO) transmission is used, the CQI includes necessary MIMO-related feedback. The HARQ feedback in response to downlink data transmission consists of a single ACK/NACK bit per HARQ process. The PUCCH resources for SRI and CQI reporting are assigned and can be revoked through RRC signaling. A SRI is not necessarily assigned to UEs acquiring synchronization through the RACH (i.e., synchronized UEs may or may not have a dedicated SRI channel). PUCCH resources for SRI and CQI are lost when the UE is no longer synchronized.

Reference can also be made to 3GPP TR 36.211, V1.0.0 (2007, March), 3rd Generation Partnership Project; Technical Specification Group Radio Access Network; Physical Channels and Modulation (Release 8), for a description in Section 5 of the UL physical channels, including the PUSCH (Section 5.3), the PUCCH (Section 5.4), and the reference signals DM RS (associated with transmission of the PUSCH or PUCCH) and SRS (not associated with transmission of the PUSCH or PUCCH) in Section 5.5.

Recently proposed have been enhancements to the Rel. 8 (LTE) system, which may be referred to as Rel. 9 or as LTE-Advanced (LTE-A). Backward compatibility of LTE and its further releases is being emphasized. It has been decided that LTE Rel. 8 terminals should be able to operate in the LTE-A system. Furthermore, it has been decided that LTE-A terminals should be able to operate in LTE Rel. 8 system. The LTE-A system may provide a significantly wider bandwidth (e.g., 100 MHz) made up of, for example, five channel bonded 20 MHz carriers.

Reference with regard to LTE-A may be made to 3GPP TSG RAN WG1 Meeting #53, Kansas City, USA, May 5-9, 2008, R1-081948, Proposals for LTE-Advanced Technologies, NTT DoCoMo, Inc.

Reference can also be made to 3GPP TR 36.913, V0.0.6 (2008, May), 3rd Generation Partnership Project; Technical Specification Group Radio Access Network; Requirements for Further Advancements for E-UTRA (LTE-Advanced) (Release X).

There is an increasing focus on extending and optimizing 3GPP radio access technologies for Local Area (LA) access solutions in order to provide new services with high data rates and with low cost.

One problem to be addressed is how to best arrange/optimize UL control channel transmission in the LTE-A FDD/TDD system, as there are differences between Rel. 8 (FDD/TDD) and LTE-A assumptions which have a bearing on the UL control channel design.

Combining IFDMA with the sounding reference signal was presented in R1-050816, "Frequency-domain scheduling with SC-FDMA in UL", 3GPP TSG-RAN Meeting #42, London, UK, 29 Aug.-2 Sep. 2005, Nokia.

Also of interest is R1-061862, "Uplink Non-data-associated Control Signaling", TSG-RAN WG1 LTE AdHoc, Cannes, France, Jun. 27-30, 2006, Ericsson. FIG. 1 herein reproduces FIG. 2-1 of R1-061862 and shows the principle of how distributed and localized transmissions are time multiplexed within one UL TTI. The distributed part is transmitted at the beginning of the TTI, and contains at least one pilot block. The first long block in the uplink frame structure is split into two short blocks. The first short block is used for ACK/NACK transmission, where different UEs are separated in the frequency domain by using different "combs". Which "comb" to use is given by the downlink scheduling assignment. The second short block in is used for reference signals for coherent demodulation of the ACK/NACK and for channel sounding.

A question that has not been adequately addressed thus far relates to the backward compatibility issue of LTE-A with Rel. 8, that is, how to optimize the control channel transmission in such a manner that backward compatibility with LTE terminals operating in the same physical resource can be maintained.

SUMMARY

The below summary section is intended to be merely exemplary and non-limiting.

The foregoing and other problems are overcome, and other advantages are realized, by the use of the exemplary embodiments of this invention.

In a first aspect thereof the exemplary embodiments of this invention provide a method for performing uplink signaling and data transmission between a terminal device and a network element. The method includes applying, during a transmission, at least one of time division multiplexing and frequency division multiplexing between a sounding reference signal, a control channel, a demodulation reference signal and a data channel. The method also includes applying clustered sub carrier mapping for the sounding reference signal and the control channel. Transmitting the sounding reference signal so as to function as a demodulation reference signal for the control channel is included in the method. The method also includes transmitting the control channel and the data channel during a same sub-frame.

In a further aspect thereof the exemplary embodiments of this invention provide a method for receiving uplink signaling and data transmission from a terminal device at a network element. The method includes receiving a sounding reference signal and receiving a control channel and a data channel during a same sub-frame. The method also includes extracting control information and data from the control channel and the data channel. Using the sounding reference signal as a demodulation reference signal for the control channel is included in the method.

In another aspect thereof the exemplary embodiments of this invention provide a computer readable medium tangibly encoded with a computer program executable by a processor to perform actions performing uplink signaling and data transmission between a terminal device and a network element. The actions include applying, during a transmission, at least one of: time division multiplexing and frequency division multiplexing between a sounding reference signal, a control channel, a demodulation reference signal and a data channel. Applying clustered sub carrier mapping for the sounding reference signal and the control channel is also included in the method. The method also includes transmitting the sounding reference signal so as to function as a demodulation reference signal for the control channel and transmitting the control channel and the data channel during a same sub-frame.

In a further aspect thereof the exemplary embodiments of this invention provide a computer readable medium tangibly encoded with a computer program executable by a processor to perform actions for receiving uplink signaling and data transmission from a terminal device at a network element. The actions include receiving a sounding reference signal and receiving a control channel and a data channel during a same sub-frame. Extracting control information and data from the control channel and the data channel is also included in the method. The method also includes using the sounding reference signal as a demodulation reference signal for the control channel.

In another aspect thereof the exemplary embodiments of this invention provide an apparatus for performing uplink signaling and data transmission between a terminal device and a network element. The apparatus includes at least one processor; and at least one memory including computer program code. The at least one memory and the computer program code are configured to, with the at least one processor, cause the apparatus to perform at least the following: apply, during a transmission, at least one of: time division multiplexing and frequency division multiplexing between a sounding reference signal, a control channel, a demodulation reference signal and a data channel; apply clustered sub carrier mapping for the sounding reference signal and the control channel; generate a signal to cause a transmission of the sounding reference signal so as to function as a demodulation reference signal for the control channel; and generate a signal to cause a transmission of the control channel and the data channel during a same sub-frame.

In a further aspect thereof the exemplary embodiments of this invention provide an apparatus for receiving uplink signaling and data transmission from a terminal device at a network element. The apparatus includes at least one processor; and at least one memory including computer program code, the at least one memory and the computer program code configured to, with the at least one processor, cause the apparatus to perform at least the following: generate a signal to cause a reception of a sounding reference signal; generate a signal to cause a reception of a control channel and a data channel during a same sub-frame; extract control information and data from the control channel and the data channel; and use the sounding reference signal as a demodulation reference signal for the control channel.

In another aspect thereof the exemplary embodiments of this invention provide an apparatus for performing uplink signaling and data transmission between a terminal device and a network element. The apparatus includes means for applying, during a transmission, at least one of: time division multiplexing and frequency division multiplexing between a sounding reference signal, a control channel, a demodulation reference signal and a data channel. Means for applying clustered sub carrier mapping for the sounding reference signal and the control channel are also included. The apparatus also includes means for generating a signal to cause a transmission of the sounding reference signal so as to function as a demodulation reference signal for the control channel. Means for generating a signal to cause a transmission of the control channel and the data channel during a same sub-frame are also included.

In a further aspect thereof the exemplary embodiments of this invention provide an apparatus for receiving uplink signaling and data transmission from a terminal device at a network element. The apparatus includes means for generating a signal to cause a reception of a sounding reference signal. Means for generating a signal to cause a reception of a control channel and a data channel during a same sub-frame are also included. The apparatus also includes means for extracting control information and data from the control channel and the data channel. Means for using the sounding reference signal as a demodulation reference signal for the control channel are also included.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 3 shows time/frequency resources as organized for use in a first backward compatible embodiment of the invention used for transmitting the SRS, control signals (PUCCH), DM RS and data (PUSCH).

FIG. 4 shows time/frequency resources as organized for use in a second backward compatible embodiment of the invention used for transmitting the SRS, control signals (PUCCH), DM RS and data (PUSCH).

FIG. 7 is a non-limiting example of resource indexing.

FIG. 8 depicts a table showing an example of an available number of bits per block for control channels for various modulation types and rates (QPSK 1/3, QPSK 1/2, 16QAM 1/2).

FIGS. 10A and 10B, collectively referred to as FIG. 10, show a special case of clustered sub-carrier transmission with two clusters.

DETAILED DESCRIPTION

Figure 1:
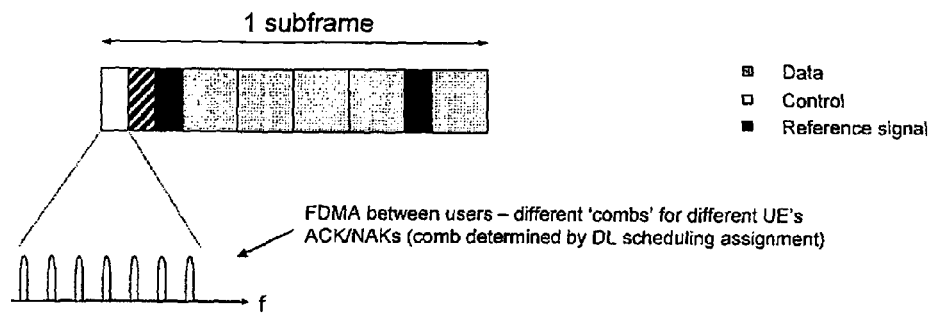
FIG. 1 reproduces FIG. 2-1 of R1-061862 and shows a slot format.

The exemplary embodiments of this invention relate at least in part to a LTE-A system, such as a LA-optimized radio system fulfilling ITU-R requirements for IMT-Advanced. An aspect of such a system is that it can include a TDD mode in unpaired spectrum. It should be noted as well that LTE-A may evolve so as to also encompass wide area (WA) and FDD aspects of operation.

The exemplary embodiments provide a multiplexing arrangement for a sounding reference signal, data-non-associated control channel (frequency diversity transmission) and an UL shared data channel. One type of system that may benefit from the use of these exemplary embodiments is one that exhibits a nomadic/LA optimized UL having a flexible and broad RF bandwidth (e.g., up to 100 MHz).

A question that arises is the degree of backward compatibility that is needed for LTE-A as compared to LTE Rel. 8. One reasonable assumption related to LTE-A is that the UE will have 20 MHz minimum capability. Another reasonable assumption is that a backward compatible radio arrangement includes N×20 MHz frequency chunks that together make up the 100 MHz system bandwidth (N=1, 2, 3, 4, 5).

It can be noted that the LTE-A requirements are quite different than those of LTE Rel. 8 TDD/FDD. One significant difference is that the maximum number of control bits can be significantly larger in LTE-A. It can also be noted that the deployment scenario in LTE-A LA is very different than the macro cell approach assumed in LTE. One consequence of the LA environment is that there should be no coverage problem related to control signaling.

From a requirements point of view a sufficient degree of frequency diversity may be needed for the UL data-non-associated control signaling such as (DL) ACK/NACK and CQI. This is due to the fact that control signaling is time-critical, and does benefit from the use of HARQ. From the TDD perspective, although the UE has full knowledge of the fast fading characteristics of the UL channel (due to reciprocity) it has no knowledge of the instantaneous interference situation in the UL (note that the LA is strongly interference limited). Furthermore, one can assume that an eNodeB is in charge of resource allocation for UL control channels. As a consequence of this the UE does benefit from the channel knowledge in the UL control signaling, meaning that frequency diversity transmission should be used.

The LTE baseline configuration/parameters may include the following. The UL control signaling in LTE TDD has been optimized for the macro cellular environment (i.e., coverage limited case), and has been divided into two classes:

1. control signaling in the absence of UL data: PUCCH is used (CDM between UEs inside the PUCCH resource block, FDM between UEs outside PUCCH resource blocks); and 2. control signaling in the presence of UL data: PUSCH is used (TDM between control and data).

The simultaneous transmission of PUCCH and PUSCH is not supported. Control signaling on the PUCCH is based on sequence modulation using a 180 kHz bandwidth. Further, in order to obtain a sufficient degree of frequency diversity a slot-based frequency hopping technique is always applied. Furthermore, in LTE the UL sounding and UL control signaling are completely decoupled.

At least several problems can arise if the LTE approach were to be applied to the LTE-A system. In general, in terms of the UL control channel arrangement the LTE approach is not an optimum solution in the LA environment. More specifically, it can be shown that in a LA-optimized system there is no coverage reason to have separate resources for control signaling with UL data and without UL data, as in LTE. Further, the PUCCH transmission spanning over the entire TTI cannot be optimized from the UE power consumption point of view (in a case when the coverage is not a problem). In general, TDM between data and control is better used with a DTX procedure. Further still, sequence modulation used in LTE provides at maximum 20 uncoded bits per subframe. (40 bits with multicode having two code channels). This is clearly not sufficient when compared to LTE-A requirements, especially in TDD mode where up to about 100-200 coded control bits may needed. Further in this regard, note that increasing the PUCCH bandwidth does not increase the size of the payload when using sequence modulation, without the use of multicodes (which in turn increases the CM). Further, from an overhead point of view it is not efficient to provide separate RS resources for the control channel and for the UL sounding reference signal. Furthermore, still another problem relates to the operation point in terms of SINR, which can be significantly higher in the LA environment. When optimizing the frequency diversity transmission (i.e., trade-off between the channel estimation error and the number of clusters) the increased SINR translates into an increased number of clusters (slot-based FH utilizes only two clusters).

As was noted above, a question that has not been adequately addressed thus far relates to the backward compatibility issue of LTE-A with Rel. 8, that is, how to optimize the control channel transmission in such a manner that backward compatibility with LTE terminals operating in the same physical resource can be maintained.

Figure 9:
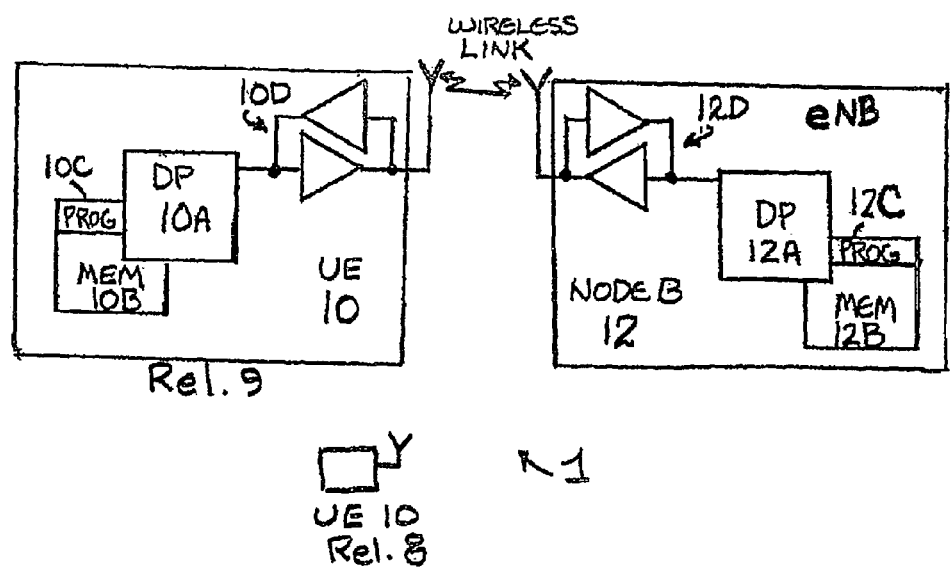
FIG. 9 shows a simplified block diagram of various electronic devices that are suitable for use in practicing the exemplary embodiments of this invention.

Before discussing the exemplary embodiments of this invention in detail reference is made to FIG. 9 for illustrating a simplified block diagram of various electronic devices that are suitable for use in practicing the exemplary embodiments of this invention. In FIG. 9 a wireless network 1 is adapted for communication with an apparatus 10, also referred to herein for convenience as a UE 10, via another apparatus, such as a network access node 12, also referred to herein for convenience as a Node B (base station) and more specifically an eNB 12. The UE 10 includes a data processor (DP) 10A, a memory (MEM) 10B that stores a program (PROG) 10C, and a suitable radio frequency (RF) transceiver 10D for bidirectional wireless communications with the eNB 12, which also includes a DP 12A, a MEM 12B that stores a PROG 12C, and a suitable RF transceiver 12D. At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the eNB 12, or by hardware, or by a combination of software and hardware.

Typically there will be a plurality of UEs 10 serviced by the eNB 12. The eNBs 10 may or may not be identically constructed, but in general are all assumed to be electrically and logically compatible with the relevant network protocols and standards needed for operation in the wireless network 1. In a given instance some of these UEs 10 may be Rel. 8 UEs, some may be LTE-A UEs, and some may be LTE-A UEs that are also capable of operating as a Rel. 8 UE.

The various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on a multicore processor architecture, as non-limiting examples.

In one aspect thereof the exemplary embodiments of this invention combine sounding reference signal (SRS) transmission with control channel transmission, where both have clustered subcarrier mapping. The SRS and the control channel occupy a (sufficiently) overlapping frequency allocation so that channel estimation of the control channel can be made from the SRS. The transmission scheme in accordance with these exemplary embodiments is applicable for use with both DFT-S-OFDM (used in Rel. 8 LTE) and OFDMA based modulation schemes.

Note that references herein to a control channel imply the use of both control channel and frequency diversity transmission. Frequency diversity transmission is used, besides the control signaling on PUCCH, for persistently or semi-persistently scheduled PUSCH. It can be seen as a complementary transmission scheme for dynamically scheduled frequency adaptive transmission.

In the approach used by various exemplary embodiments there are N_cl clusters of frequency pins (subcarriers) in the frequency domain. The clusters may or may not be equally spaced. The number of clusters is determined taking into account:

a trade-off between the channel estimation error and degree of frequency diversity;

CM properties (SC-FDMA: CM increases with the number of clusters), where in the CM sense IFDMA corresponds to a single cluster transmission; and backward compatibility issues (the use of a M×20 MHz allocation having a guard band between the 20 MHz carriers). For backward compatibility reasons, it is assumed that the cluster size is a multiple of 12 frequency pins, which is the resource block size in LTE system. In other implementations the cluster size may be different.

The transmission bandwidth of N_cl clusters may be further divided into parallel channels using CDM(/FDM/TDM) within the given resource.

The exemplary embodiments may be divided into a backward compatible approach and a backward non-compatible approach.

Figure 2:
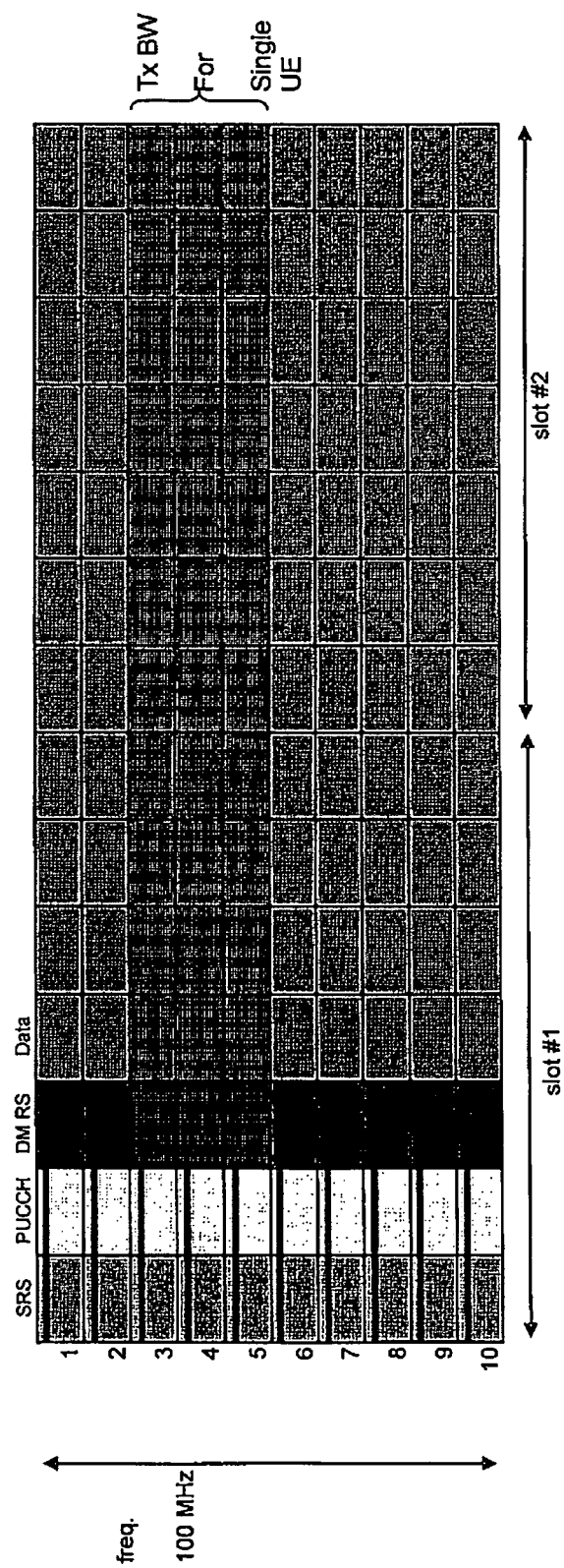
FIG. 2 shows time/frequency resources as organized for use in a backward non-compatible embodiment of the invention that may be used for transmitting the SRS, control signals (PUCCH), DM RS and data (PUSCH).

Described first is the backward non-compatible approach in reference to FIG. 2 (where the transmission bandwidth for a single UE 10 is indicated). This embodiment may be characterized as follows:

TDM is applied between the SRS, data-non-associated control channel (PUCCH), the demodulation reference signal (DM RS) and the shared data channel (PUSCH);

clustered sub-carrier mapping is applied for the sounding reference signal and control channel (PUCCH), where the number of clusters equals 10 (as a non-limiting example); the SRS functions as a DM RS for the control channel (PUCCH);

the PUCCH and PUSCH may be transmitted during the same sub-frame (i.e., no separate control resources are needed for control signals transmitted with or without UL data); and if the UE 10 has no control signals to be transmitted, it may transmit shared data on the control resource.

In this embodiment it can be noted that the use of TDM does not cause any coverage problem in LA since the coverage is limited by the interference (additional processing gain can be used to meet a given target quality), and furthermore that it is beneficial from a DTX/DRX point of view. In addition, the use of this technique enables low PAR transmission for both the data and control. Since the sounding (SRS) is combined with the control channel transmission the SRS transmission functions in a manner analogous to DM RS for the control signals (PUCCH). This approach also provides IFDMA/clustered (O)FDMA between UEs 10.

Described now are several backward compatible embodiments with reference to FIGS. 3-8.

Embodiment A

A first backward compatible embodiment is shown in FIG. 3, which may be characterized as follows for both LTE-A and LTE Rel. 8 operation.

LTE-A Operation:

TDM is used between the SRS, data-non-associated control channel (PUCCH), demodulation reference signal (DM RS) and shared data channel (PUSCH) within one UE 10;

the number of clusters is equal to the number of frequency chunks (e.g., 5 chunks, each 20 MHz in FIG. 3); and the PUCCH and PUSCH can be transmitted during the same sub-frame (i.e., no separate control resources for control signals transmitted with and without UL data).

Rel. 8 Operation:

Rel. 8 UEs 10 puncture two symbols in the case where the Rel. 8 PUSCH overlaps the LTE-A PUCCH, however overlapping can be avoided by using (Node B 12) scheduler limitations; and the SRS symbol and special TDD blocks may be used for the LTE-A PUCCH in order to minimize a legacy impact. More specifically, the special TDD blocks relate to Frames structure type 2 described in 3GPP TS 36.211, Section 4.2 (see 3GPP TR 36.211, V1.0.0). The UpPTS is reserved for UL transmission and can be used for SRS transmission. The legacy impact can be minimized in such a way that the PUCCH is transmitted using the UpPTS, whereas the SRS block utilizes the original SRS resource.

Embodiment B

A second backward compatible embodiment is presented in FIG. 4.

LTE-A Operation:

FDM is used between the PUSCH and PUCCH within one UE 10;

clustered sub-carrier mapping is used on the PUCCH. The cluster size is a multiple of the LTE Rel. 8 resource block size. The applied clusters can be explicitly configured via RRC signaling. In one embodiment, the number of clusters equals the number of frequency chunks (e.g., 5 chunks, each 20 MHz in width in FIG. 4); and TDM is applied between the SRS/PUCCH DM RS and the control channel (PUCCH), where CDM/TDM may be applied between different UEs 10 within the given clusters.

Figure 5:
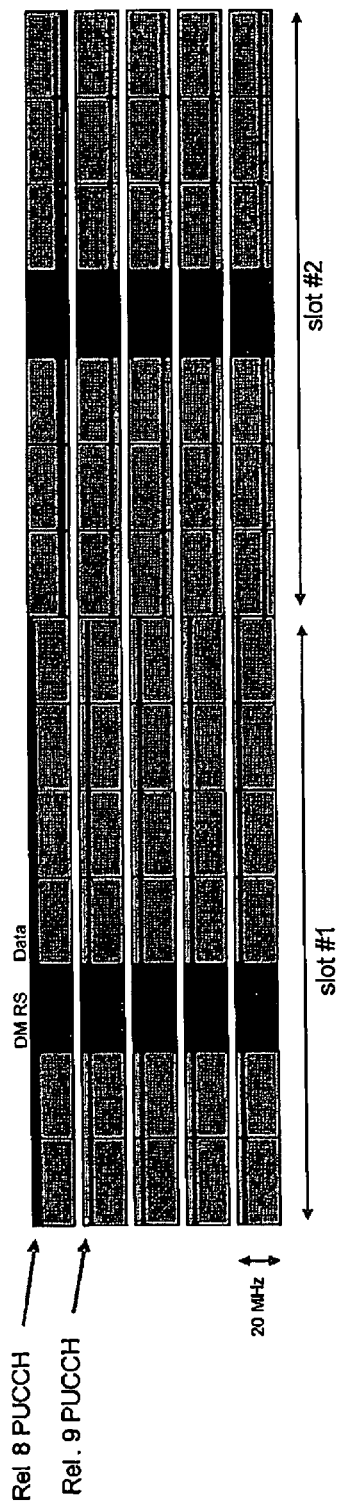
FIG. 5 shows the second backward compatible embodiment of FIG. 4 modified to include slot-based frequency hopping that doubles a number of effective clusters.

Note that it is also possible to apply slot-based frequency hopping (FH) in the LTE-A PUCCH (similar as to that used in the Rel. 8 PUCCH). The use of FH doubles the effective number of clusters (from 5 to 10 in this example), as shown in FIG. 5.

One special case with regard to clustered sub-carrier transmission is to have only two clusters, as shown in FIG. 10. FIG. 10 assumes that there is a primary chunk defined which is used to transmit the PDCCH. The Node B 12 can schedule the PDSCH/PUSCH using the primary PDCCH into any of the chunks. One benefit is that the UE 10 needs to listen only to the PDCCH from the primary chunk. From the LTE-A PUCCH point of view there are two ways to arrange two clusters: one shown in FIG. 10A and another shown in FIG. 10B.

FIG. 10A assumes that there is a "primary PUCCH chunk" in addition to the primary PDCCH chunk. The bandwidth of the primary PUCCH corresponds to the bandwidth of the UL chunk (20 MHz in this example). Two clusters can be placed symmetrically over the chunk bandwidth. The two clusters shown in FIG. 10A can be used for (1) single-cluster transmission using slot-based frequency hopping or (2) dual cluster transmission without slot based frequency hopping.

Exemplary benefits of the FIG. 10A approach are: that the cluster configuration can be made fully compatible with the Rel. 8 PUCCH. Furthermore, there are no problems with different LTE-A UE categories with the current assumptions (all LTE-A UEs support the 20 MHz chunk). Furthermore, implicit mapping of dynamic ACK/NACK resources can be based on the LTE-A PDCCH of the primary chunk, and is fully compatible with Rel. 8 PUCCH. Yet another benefit of this arrangement is that LTE-A and LTE Rel. 8 can co-exist in the same PUCCH resources. The only consideration that arises in the FIG. 10A approach is that the degree of frequency diversity is not optimized.

The FIG. 10B approach optimizes the frequency diversity. Backwards compatibility can be arranged in such a way that there is a FDM separation between the LTE-A PUCCH and the LTE Rel. 8 PUCCH. This can be realized in such a manner that an index for the first available PUCCH RB is signaled via higher layers to the LTE-A UEs 10. This information is needed separately for each used cluster. It is noted also that different UE bandwidth categories of LTE-A (such as 100 MHz, 40 MHz, etc.), may require their own PUCCH resources and PUCCH RB signaling in the approach of FIG. 10B. The same applies for implicit ACK/NACK resources of dynamically scheduled DL data. Due to these considerations the use of this approach may be most beneficial for persistent type of signaling cases, such as CQI and persistent PUSCH.

In the dual cluster transmission approach the minimum change from the LTE Rel. 8 PUCCH point of view is to place the two clusters symmetrically (approximately) over the UL system/transmission bandwidth. Note that due to the different load of the Rel. 8 PUCCH it may not always be possible to place two clusters fully symmetrically over the center frequency). The only change involves replacing the slot-based frequency hopping by dual cluster transmission. In yet another embodiment two clusters are placed symmetrically over the frequency chunk (similar to LTE Rel. 8).

One may note that in the case of only a few frequency clusters (e.g., two clusters), the channel sounding capability of DM RS of PUCCH may not be sufficient. In these cases, an additional sounding reference signal can be used as well With specific regard to the division between the PUSCH and PUCCH at least two options are available:

the simultaneous transmission of the PUSCH and PUCCH is supported (no separate control resources on the PUSCH), which favors OFDM; or the simultaneous transmission of the PUSCH and PUCCH is not supported (separate control resources are needed on the PUSCH, similar to Rel. 8), which favors SC-FDMA.

For Rel. 8, no additional requirements are needed for Rel. 8 UEs 10.

It is noted that although the previous embodiments discussed only the PUCCH, the same principles can be applied also for persistent or semi-persistent PUSCH.

Discussed now are aspects of the clustered sub-carrier mapping. One aspect is to have no pre-determined rules for cluster arrangement. In this case, applied clusters are explicitly signaled as discussed earlier. Another choice is to have predetermined rules for the cluster arrangement. In this regard one may define the sub-carrier mapping in the following way (see also the example shown in FIG. 6):

K_tot: total number of available frequency pins
K_bl: number of available frequency pins per block
K: total number of allocated frequency pins
N_cl: number of clusters
N_bl/cl: number of blocks per cluster
N: number of allocated blocks per cluster (adjacent in frequency).

Figure 6:
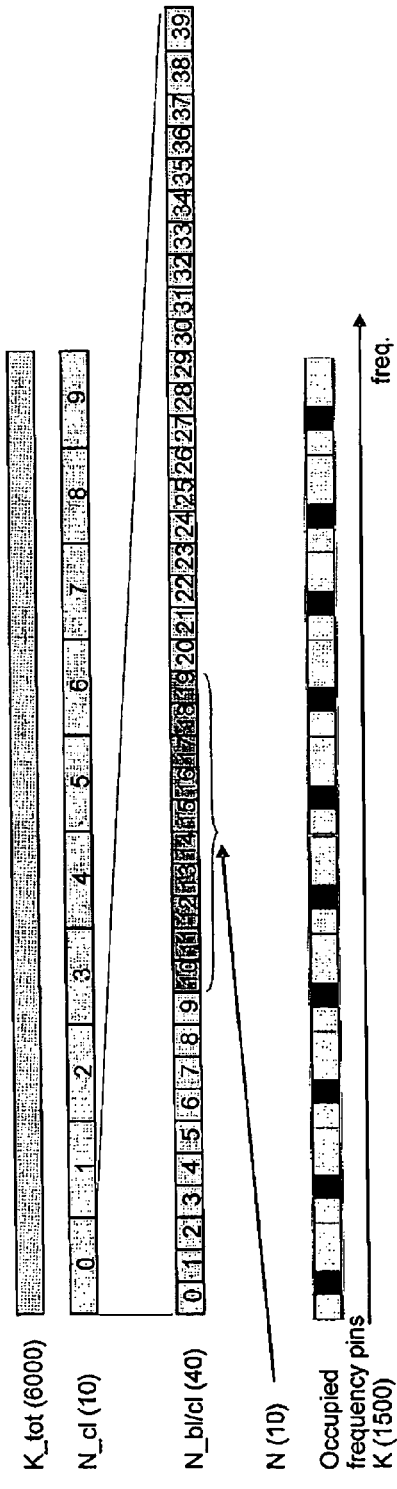
FIG. 6 illustrates the principle of clustered sub-carrier mapping.

FIG. 6 shows the underlying principle of clustered sub-carrier mapping. The available spectrum (K_tot frequency pins) is divided into N_cl equally spaced clusters of sub-carriers (frequency pins). Each cluster is further divided into N_bl/cl blocks. One control/SRS resource consists of N consecutive blocks from each cluster. The total number of occupied frequency pins, K, is given by the following equation:

$$K = N \times K\_tot/N\_bl/cl.$$

It is noted that N adjacent blocks within each cluster can be further divided into parallel channels using CDM(/FDM) within the given resource. There are at least two ways to realize the CDM inside the cluster. One technique is based on a block spreading operation made separately for each cluster. Another technique is based on cyclic shift separation of CAZAC (constant amplitude zero autocorrelation) sequences or ZAC (zero autocorrelation) sequences. It is noted that both schemes can be in use at the same time.

It is further noted that IFDMA may be considered to be a special case of clustered subcarrier mapping (K_bl=1), and is applicable when N_bl/cl=RPF, N_cl=K_tot/RPF, and N=1, where RPF is the repetition factor.

FIG. 7 shows an example of resource indexing assuming existing LTE parameters (15 kHz subcarrier spacing, 100 MHz bandwidth, K_tot=6000 subcarriers). The following parameter values are assumed for this example:

N_cl=10 clusters;
N_bl/cl=40 blocks/cluster; and
allowed resource sizes (N): [1, 5, 10, 20, 40] blocks.

A code-tree approach may be used in the resource allocation within the cluster. Note that only 6 bits (55 resources) are needed to signal the frequency allocation for each control resource.

It is also pointed out that it is possible to size the control resource within the cluster in such a manner that the block size (K_bl) is equal to 12 frequency pins. This approach provides a Rel. 8 compatible reference signal design.

The table shown in FIG. 8 depicts the available number of bits per block for control channels, more specifically the achievable number of bit rates as a function of N, N_cl=10 and N_bl/cl=40. Note that it is possible to transmit distributed data when some part of the control signaling is absent.

A number of advantages can be realized by the use of these exemplary embodiments of the invention, as compared to the Rel. 8 approach. These advantages include, but are not limited to, the following.

It can be shown that the total UL control overhead is reduced at least 7%, as compared to the Rel. 8 baseline approach. Reasons for this improvement include a better optimization of the relationship between channel estimation error and frequency diversity (slot-based FH is quite optimal in a low SNR area with a narrow coherence BW), and further no separate control resources are needed for two cases of UL transmission with and without UL data. In addition, the use of these exemplary embodiments results in a smaller control overhead, a simplified control plane design, and a more robust design with respect to signaling errors.

A further advantage is an improved power saving capability is realized, as control/SRS signaling is more attractive from the DTX/DRX point of view.

Further advantages include the provision of a flexible resource allocation/signaling scheme and support for low-CM transmission.

Based on the foregoing it should be apparent that the exemplary embodiments of this invention provide a method, apparatus and computer program product(s) to enhance the uplink control and data signaling of the UE 10 towards the Node B 12.

In a first exemplary embodiment there is provided a method, a computer program and apparatus, which may be embodied as the whole of the UE 10 or as a part of the UE 10, to transmit information from the UE 10 to the Node B 12. During the transmission, time division multiplexing is applied between a sounding reference signal, a control channel, a demodulation reference signal and a data channel; clustered sub-carrier mapping is applied for the sounding reference signal and the control channel; the sounding reference signal is transmitted so as to function as a demodulation reference signal for the control channel; and the control channel and the data channel are transmitted during the same sub-frame.

In accordance with the method, the computer program and the apparatus of the preceding paragraph, where if the UE 10 has no control signal to transmit it may instead transmit data using at least an uplink resource allocated for the control channel.

In accordance with the method, the computer program and the apparatus of the preceding paragraphs, where the control channel is a data-non-associated physical uplink control channel (PUCCH), and where the data channel is a physical uplink shared channel (PUSCH).

In accordance with the method, the computer program and the apparatus of the preceding paragraphs, where a total uplink bandwidth is 100 MHz, and where there are 10 clusters each of 10 MHz bandwidth.

In accordance with the method, the computer program and the apparatus of the preceding paragraphs, where a plurality of clusters are used by a single UE to transmit the uplink signal.

In accordance with the method, the computer program and the apparatus of the preceding paragraph, where the plurality of clusters are contiguous in frequency.

In accordance with the method, the computer program and the apparatus of the preceding paragraphs, where the uplink transmission extends over two time slots, where the sounding reference signal, the control channel, the demodulation reference signal and a first portion of the data channel are transmitted during the first time slot, and where the remainder of the data channel is transmitted during the second time slot.

In accordance with the method, the computer program and the apparatus of the preceding paragraphs, where the transmission is not backward compatible with Rel. 8.

Further in accordance with this embodiment there is a network access node and related method and computer program configured to receive the uplink transmission, and to extract control information and data from the control channel and the data channel, and further configured to use the sounding reference signal as a demodulation reference signal for the control channel.

In another exemplary embodiment there is provided a method, a computer program and apparatus, which may be embodied as the whole of the UE 10 or as a part of the UE 10, to transmit information from the UE 10 to the Node B 12, where in this embodiment during LTE-A operation time division multiplexing is applied between a sounding reference signal, a control channel, a demodulation reference signal and a data channel within a single UE 10, clustered sub-carrier mapping is applied, where a number of clusters is equal to a number of frequency chunks; where the sounding reference signal is transmitted so as to function as a demodulation reference signal for the control channel; and the control channel and the data channel are transmitted during the same sub-frame, and during Rel. 8 operation the UE 10 punctures, if needed, two symbols where the Rel. 8 data channel overlaps the LTE-A data channel.

In another exemplary embodiment there is provided a method, a computer program and apparatus, which may be embodied as the whole of the UE 10 or as a part of the UE 10, to transmit information from the UE 10 to the Node B 12, where in this embodiment during LTE-A operation frequency division multiplexing is applied between the control channel and the data channel within a single UE 10, clustered sub-carrier mapping is applied for the control channel, where a number of clusters is equal to a number of frequency chunks; where time division multiplexing is applied between the sounding reference signal and the control channel; and where either simultaneous transmission of the control channel and the data channel is supported or is not supported.

In accordance with the method, the computer program and the apparatus of the preceding paragraph, where slot-based frequency hopping is used for the control channel.

In accordance with the method, the computer program and the apparatus of the preceding embodiments, where clustered sub-carrier mapping is performed in accordance with:

K_tot: total number of available frequency pins
K_bl: number of available frequency pins per block
K: total number of allocated frequency pins
N_cl: number of clusters
N_bl/cl: number of blocks per cluster
N: number of allocated blocks per cluster (adjacent in frequency);

where available spectrum (K_tot frequency pins) is divided into N_cl equally spaced clusters of sub-carriers (frequency pins), and each cluster is further divided into N_bl/cl blocks; where one control channel, sounding reference signal resource comprises N consecutive blocks from each cluster; and where a total number of occupied frequency pins, K, is given by:

$$K = N \times K\_tot/N\_bl/cl.$$

In accordance with the method, the computer program and the apparatus of the preceding paragraph, where IFDMA is a case of clustered subcarrier mapping where (K_bl=1), and is applicable when N_bl/cl=RPF, N_cl=K_tot/RPF, and N=1, where RPF is the repetition factor.

In accordance with the method, the computer program and the apparatus of the preceding paragraphs, where the cluster size is a multiple of Rel. 8 LTE resource block size.

In accordance with the method, the computer program and the apparatus of the preceding paragraphs, where there are two clusters in a clustered sub-carrier transmission approach, where there is a primary PUCCH chunk and a primary PDCCH chunk, where the bandwidth of the primary PUCCH chunk corresponds to the bandwidth of the UL chunk (e.g., 20 MHz), and where the two clusters are placed approximately symmetrically over the chunk bandwidth.

In accordance with the method, the computer program and the apparatus of the preceding paragraphs, where there are two clusters in a clustered sub-carrier transmission approach, where FDM separation is arranged between the LTE-A PUCCH and the LTE Rel. 8 PUCCH, and where the two clusters are arranged approximately symmetrically over the UL bandwidth.

Based on the foregoing it should be apparent that the exemplary embodiments of this invention provide a method, apparatus and computer program(s) to perform uplink signaling and data transmission between a terminal device and a network access node.

Figure 11:
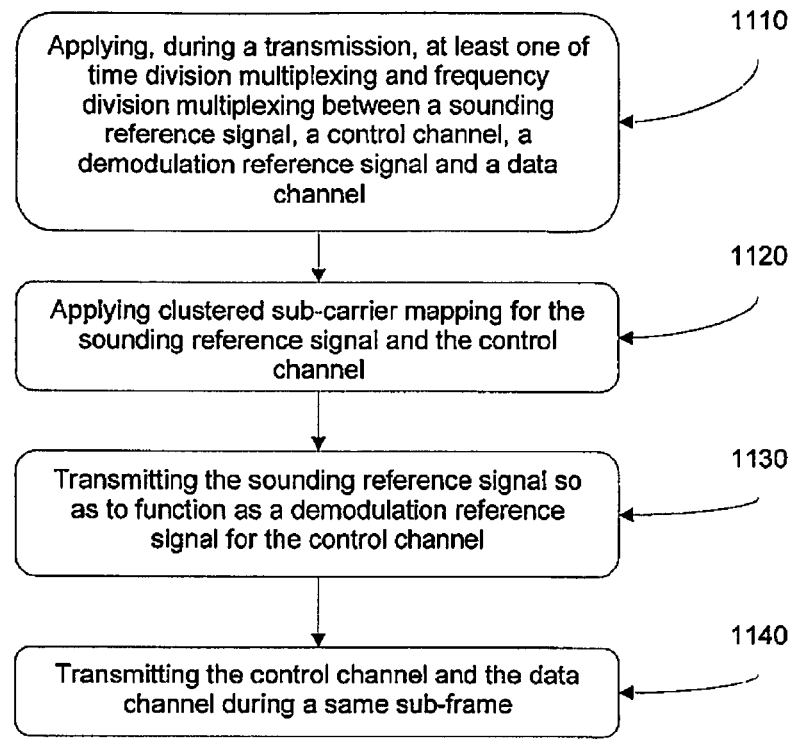
FIG. 11 is a logic flow diagram that illustrates the operation of a method in accordance with the exemplary embodiments of this invention.

FIG. 11 is a logic flow diagram that illustrates the operation of a method, and a result of execution of computer program instructions, in accordance with the exemplary embodiments of this invention. In accordance with these exemplary embodiments a method performs, at Block 1110, a step of applying, during a transmission, at least one of time division multiplexing and frequency division multiplexing between a sounding reference signal, a control channel, a demodulation reference signal and a data channel. A step of applying clustered sub carrier mapping for the sounding reference signal and the control channel is performed at Block 1120. At Block 1130, a step of transmitting the sounding reference signal so as to function as a demodulation reference signal for the control channel is performed. A step of transmitting the control channel and the data channel during a same sub-frame is performed at Block 1140.

Figure 12:
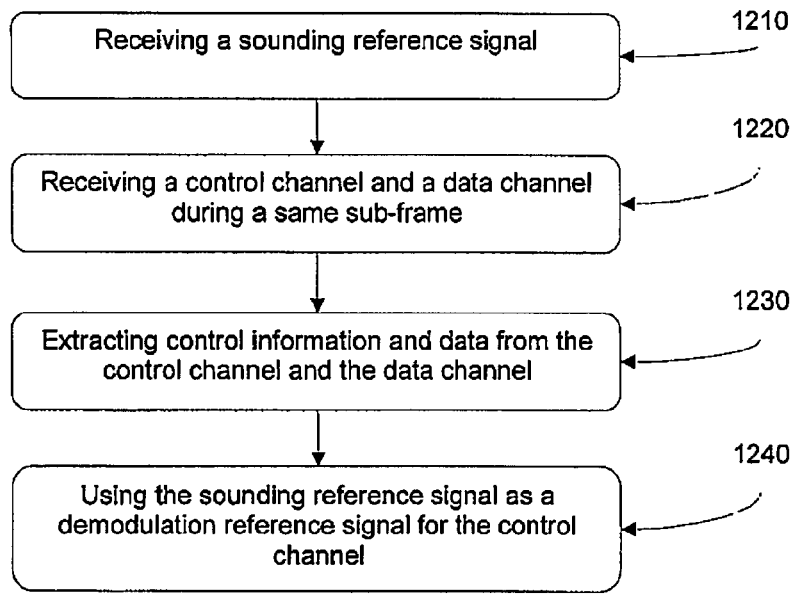
FIG. 12 is a logic flow diagram that illustrates the operation of another method in accordance with the exemplary embodiments of this invention.

FIG. 12 is a logic flow diagram that illustrates the operation of a method, and a result of execution of computer program instructions, in accordance with the exemplary embodiments of this invention. In accordance with these exemplary embodiments a method performs, at Block 1210, a step of receiving a sounding reference signal is performed. A step of receiving a control channel and a data channel during a same sub-frame is performed at Block 1220. At Block 1230, a step of extracting control information and data from the control channel and the data channel is performed. A step of using the sounding reference signal as a demodulation reference signal for the control channel is performed at Block 1240.

The various blocks shown in FIGS. 11 and 12 may be viewed as method steps, and/or as operations that result from operation of computer program code, and/or as a plurality of coupled logic circuit elements constructed to carry out the associated function(s).

These various exemplary embodiments may be viewed as comprising method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN LTE, Rel. 8) system and the LTE-Advanced (Rel. 10) system, it should be appreciated that the exemplary embodiments of this invention are not limited for use with only these particular types of wireless communication systems, and that they may be used to advantage in other wireless communication systems.

Further, the various names used for the described parameters (e.g., K_tot, K_bl, etc.) are not intended to be limiting in any respect, as these parameters may be identified by any suitable names. Further, the formulas and expressions that use these various parameters may differ from those expressly disclosed herein. Further, the various names assigned to different channels (e.g., PUSCH, PUSCH, etc.) are not intended to be limiting in any respect, as these various channels may be identified by any suitable names.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
applying, during a transmission, at least one of time division multiplexing and frequency division multiplexing between a sounding reference signal, a control channel, a demodulation reference signal and a data channel;
applying clustered sub-carrier mapping for the sounding reference signal and the control channel;
transmitting the sounding reference signal so as to function as a demodulation reference signal for the control channel; and
transmitting information on the control channel and information on the data channel during a same sub-frame,
wherein backward compatibility is provided by using a sounding reference signal symbol and special time division duplex blocks for the control channel in order to minimize legacy impact, said special time division duplex blocks corresponding to a long-term evolution-advanced physical uplink control channel.

2. The method of claim 1, where, in response to there being no control signal to transmit, transmitting data using at least an uplink resource allocated for the control channel.

3. The method of claim 1, where the control channel is a data-non-associated physical uplink control channel, and where the data channel is a physical uplink shared channel.

4. The method of claim 1, where a total uplink bandwidth is 100 MHz, and where there are 10 clusters each of 10 MHz bandwidth.

5. The method of claim 1, where a plurality of clusters is used by the terminal device to transmit the sounding reference signal.

6. The method of claim 5, where the plurality of clusters is contiguous in frequency.

7. The method of claim 1, where transmitting information on the control channel and information on the data channel comprises:
transmitting the information on the control channel and a first portion of the information on the data channel during a first time slot, where the sounding reference signal is transmitted in the first time slot; and
transmitting a remainder of the information on the data channel during a second time slot.

8. The method of claim 1, further comprising:
puncturing at least two symbols where a data channel associated with a first protocol overlaps a data channel associated with a second protocol.

9. The method of claim 1, where frequency division multiplexing is applied and where slot-based frequency hopping is used for the control channel.

10. The method of claim 1, where clustered sub carrier mapping is performed in accordance with:
a total number of available frequency pins, K_tot;
a number of available frequency pins per block, K bl;
a total number of allocated frequency pins, K;
a number of allocated blocks per cluster, N;
a number of clusters, N_cl; and
a number of blocks per cluster, N_bl/cl.

11. A method comprising:
demultiplexing, during a reception, at least one of time division multiplexing and frequency division multiplexing between a sounding reference signal, a control channel, a demodulation reference signal and a data channel;
receiving the sounding reference signal;
receiving information on the control channel and information on the data channel during a same sub-frame;
extracting control information and data from the information on the control channel and the information on the data channel; and
using the sounding reference signal as a demodulation reference signal for the control channel,
wherein backward compatibility is provided by using a sounding reference signal symbol and special time division duplex blocks for the control channel in order to minimize legacy impact, said special time division duplex blocks corresponding to a long-term evolution-advanced physical uplink control channel.

12. The method of claim 11, where the control channel is a data-non-associated physical uplink control channel, and where the data channel is a physical uplink shared channel.

13. The method of claim 11, where a total uplink bandwidth is 100 MHz, and where there are 10 clusters each of 10 MHz bandwidth.

14. The method of claim 11, where a plurality of clusters is used by the network element to receive the sounding reference signal.

15. The method of claim 14, where the plurality of clusters is contiguous in frequency.

16. The method of claim 11, where receiving information on a control channel and information on a data channel comprises:
receiving the information on the control channel and a first portion of the information on the data channel during a first time slot, where the sounding reference signal is received in the first time slot; and
receiving a remainder of the information on the data channel during a second time slot.

17. A computer program product comprising a non-transitory computer readable storage medium bearing computer program code embodied therein for use with a computer, the computer program code comprising code for performing actions comprising:
applying, during a transmission, at least one of time division multiplexing and frequency division multiplexing between a sounding reference signal, a control channel, a demodulation reference signal and a data channel;
applying clustered sub-carrier mapping for the sounding reference signal and the control channel;
transmitting the sounding reference signal so as to function as a demodulation reference signal for the control channel; and
transmitting information on the control channel and information on the data channel during a same sub-frame,
wherein backward compatibility is provided by using a sounding reference signal symbol and special time division duplex blocks for the control channel in order to minimize legacy impact, said special time division duplex blocks corresponding to a long-term evolution-advanced physical uplink control channel.

18. The computer program product of claim 17, where the control channel is a data-non-associated physical uplink control channel, and where the data channel is a physical uplink shared channel.

19. The computer program product of claim 17, where a plurality of clusters is used by the terminal device to transmit the sounding reference signal.

20. The computer program product of claim 19, where the plurality of clusters is contiguous in frequency.

21. The computer program product of claim 17, where transmitting information on the control channel and information on the data channel comprises:
transmitting the information on the control channel and a first portion of the information on the data channel during a first time slot, where the sounding reference signal is transmitted in the first time slot; and
transmitting a remainder of the information on the data channel during a second time slot.

22. The computer program product of claim 17, further comprising:
puncturing at least two symbols where a data channel associated with a first protocol overlaps a data channel associated with a second protocol.

23. A computer program product comprising a non-transitory computer readable storage medium bearing computer program code embodied therein for use with a computer, the computer program code comprising code for performing actions comprising:
demultiplexing, during a reception, at least one of time division multiplexing and frequency division multiplexing between a sounding reference signal, a control channel, a demodulation reference signal and a data channel;
receiving the sounding reference signal;
receiving information on the control channel and information on the data channel during a same sub-frame;
extracting control information and data from the information on the control channel and the information on the data channel; and
using the sounding reference signal as a demodulation reference signal for the control channel, wherein backward compatibility is provided by using a sounding reference signal symbol and special time division duplex blocks for the control channel in order to minimize legacy impact, said special time division duplex blocks corresponding to a long-term evolution-advanced physical uplink control channel.

24. The computer program product of claim 23, where the control channel is a data-non-associated physical uplink control channel, and where the data channel is a physical uplink shared channel.

25. The computer program product of claim 23, where a plurality of clusters is used to receive the sounding reference signal.

26. The computer program product of claim 25, where the plurality of clusters is contiguous in frequency.

27. The computer program product of claim 23, where receiving information on a control channel and information on a data channel comprises:
  receiving the information on the control channel and a first portion of the information on the data channel during a first time slot, where the sounding reference signal is received in the first time slot; and
  receiving a remainder of the information on the data channel during a second time slot.

28. An apparatus comprising:
  at least one processor; and
  at least one memory including computer program code, the at least one memory and the computer program code configured, with the at least one processor, to cause the apparatus to perform at least the following:
  apply, during a transmission, at least one of time division multiplexing and frequency division multiplexing between a sounding reference signal, a control channel, a demodulation reference signal and a data channel;
  apply clustered sub-carrier mapping for the sounding reference signal and the control channel;
  generate a signal to cause a transmission of the sounding reference signal so as to function as a demodulation reference signal for the control channel; and
  generate a signal to cause a transmission of information on the control channel and information on the data channel during a same sub-frame,
  wherein backward compatibility is provided by using a sounding reference signal symbol and special time division duplex blocks for the control channel in order to minimize legacy impact, said special time division duplex blocks corresponding to a long-term evolution-advanced physical uplink control channel.

29. The apparatus of claim 28, where the control channel is a data-non-associated physical uplink control channel, and where the data channel is a physical uplink shared channel.

30. The apparatus of claim 28, where a plurality of clusters is used to transmit the sounding reference signal.

31. The apparatus of claim 30, where the plurality of clusters is contiguous in frequency.

32. The apparatus of claim 28, where a transmission of information on the control channel and information on the data channel comprises:
  a transmission of the information on the control channel and a first portion of the information on the data channel during a first time slot, where the sounding reference signal is transmitted in the first time slot; and
  a transmission of a remainder of the information on the data channel during a second time slot.

33. The apparatus of claim 28, wherein the at least one memory and the computer program code are further configured, with the at least one processor, to cause the apparatus to perform:
  puncture at least two symbols where a data channel associated with a first protocol overlaps a data channel associated with a second protocol.

34. The apparatus of claim 28, embodied at least in part in an integrated circuit.

35. An apparatus comprising:
  at least one processor; and
  at least one memory including computer program code, the at least one memory and the computer program code configured, with the at least one processor, to cause the apparatus to perform at least the following:
  demultiplexing, during a reception, at least one of time division multiplexing and frequency division multiplexing between a sounding reference signal, a control channel, a demodulation reference signal and a data channel;
  generate a signal to cause a reception of the sounding reference signal;
  generate a signal to cause a reception of information on the control channel and information on the data channel during a same sub-frame;
  extract control information and data from the information on the control channel and the information on the data channel; and
  use the sounding reference signal as a demodulation reference signal for the control channel,
  wherein backward compatibility is provided by using a sounding reference signal symbol and special time division duplex blocks for the control channel in order to minimize legacy impact, said special time division duplex blocks corresponding to a long-term evolution-advanced physical uplink control channel.

36. The apparatus of claim 35, where the control channel is a data-non-associated physical uplink control channel, and where the data channel is a physical uplink shared channel.

37. The apparatus of claim 35, where a plurality of clusters is used to receive the sounding reference signal.

38. The apparatus of claim 37, where the plurality of clusters is contiguous in frequency.

39. The apparatus of claim 35, where the reception of information on the control channel and information on the data channel comprises:
  a reception of the information on the control channel and a first portion of the information on the data channel during a first time slot, where the sounding reference signal is received in the first time slot; and
  a reception of a remainder of the information on the data channel during a second time slot.

40. The apparatus of claim 35, embodied at least in part in an integrated circuit.

* * * * *